Jan. 22, 1957

B. E. PREVOST 2,778,663

COUPLING FOR SPLIT HUB AND SHAFT

Filed Sept. 3, 1948

INVENTOR.
Bruno E. Prevost
BY
Pearson + Pearson
attorneys.

United States Patent Office 2,778,663
Patented Jan. 22, 1957

2,778,663

COUPLING FOR SPLIT HUB AND SHAFT

Bruno E. Prevost, North Andover, Mass., assignor to John W. Bolton & Sons, Inc., Lawrence, Mass., a corporation of Massachusetts Application September 3, 1948, Serial No. 47,569

1 Claim. (Cl. 287—52.03)

This invention relates to flexible couplings of the pin type and is particularly useful in coupling together the plug shaft of a Jordan engine and the drive shaft of an electric motor. However, my invention may be used to advantage with any two shafts that are end to end in substantially the same straight line and where the clearance between the shaft ends is too small to permit insertion or withdrawal of the usual coupling members.

Jordan engines comprise a horizontal conical shell in which a conical plug carried by a shaft revolves at high speed the shell being fixed and the plug and shaft being mounted to move axially a slight amount as wear takes place. An electric motor is usually mounted on the same base as the shell and opposite the small end thereof with the motor driving shaft and the plug driven shaft on the same axis and a short distance from each other such as twelve inches.

Heretofore, a disc has been mounted on the end of each shaft each disc having elongated coupling pins extending in one direction and an integral elongated shaft collar or sleeve extending in the opposite direction, the pins being interengaged with each other by a flexible belt. After assembly, the plug shaft may be moved toward and away from the driving shaft a limited distance such as nine or ten inches. Further retraction is prevented by the interference of the hand wheel assembly and because the coupling disc strikes the bearing tracks and frame. The driving shaft is usually not movable axially at all.

Each coupling member with its elongated pins and sleeve has therefore been too long to be slid off the end of a shaft and removed through the opening between the shafts, even when the plug is retracted to the maximum amount.

For that reason coupling members have previously been in the form of a combined collar and disc, split axially into two semi-circular sections and held together by bolts, and this construction has proved cumbersome to handle as well as costly to manufacture.

I have discovered that coupling members can be made in two parts, split circumferentially into two circular sections in the form of a disc section and a hub section and that these sections can be so made as to easily slip in and out of the clearance between the shaft ends.

I provide a well known type of key on the driven and driving shafts and mount on each shaft what I call a split contractile hub. The hub member is contractile because it has a bore of uniform diameter made about one-one thousandth of an inch smaller than the diameter of the shaft upon which it is to fit. A threaded bolt or screw is so mounted in the hub as to expand the same by pressure against one side of the split, and the hub is placed on the shaft in the expanded condition. Upon reversal of the expanding bolt, the natural spring of the hub causes it to grasp the shaft with a clamping action so that it will not move axially. In addition a key way in the hub bore cooperates with the key on the shaft to cause the two to rotate together.

The hub is of an appropriate length to easily fit between the shafts in the retracted position and has a forward tapered section and a rearward projecting annular flange, similar to the above mentioned elongated sleeve or collar, in the vertical shoulder of which there are axial threaded holes to receive fastening bolts. Keys may be provided along the tapered portion which are integral therewith but which preferably are in the form of metal dowels of circular cross section inserted in a semi-circular groove in the tapered surface and extending into circular holes in the flange portion. I may use only one such key but prefer to use an even number thereof in order to properly balance the unit and to space them at equal distances around the hub circumference. The keys take some of the strain from the fastening bolts, which connect the hub flange and the disc portion, and prevent them from shearing under the high stresses which may occur in a Jordan engine.

The disc portion of my new coupling is provided with projecting coupling pins, which are usually permanently fixed thereon by welding or similar means. The pins are spaced around the outer circumference of each disc, and since one of the opposed discs is usually larger in diameter than the other, one set or series of pins fits within the circle of pins carried by the other disc. Sliding sleeves are carried on each pin which in turn carry an endless flexible belt so interwound as to permit the discs to approach each other or retract from each other while also giving a certain lost motion useful in machines with high inertia values. The pins on the disc of the driving member may be equal in length to those on the driven member or may be shorter, if desired, as shown in the drawings.

A tapered bore is provided in the disc of a size to slip on the tapered portion of the hub and become wedged thereon. Where the hub is provided with keys, as explained above, suitable keyways are provided in the tapered bore of the disc. I also provide an annular boss on the inside surface of the hub flange, which may be turned down to allow further wedging action of the disc and hub if wear should occur. The disc has what I call a primary set of axial holes or perforations, arranged to register with threaded holes on the hub flange so that fastening bolts may draw the disc and hub together and hold them firmly in place. A secondary set of axial threaded holes through the disc are also provided each opposite a solid part of the face of the hub flange.

The fastening bolts may thus be withdrawn from the primary holes and threaded into the secondary holes where they bear against the face of the hub flange, and de-wedge or disengage the disc from the hub as the bolts are turned. I could use only one fastening bolt but prefer to use a plurality of them and to so space them that the parts remain in balance. The tightening of the fastening bolts not only wedges the tapered bore of the disc onto the tapered portion of the hub but also has a tendency to squeeze the split hub thus assuring an even tighter fit between the hub bore and the shaft.

It is not essential that the inside face of the hub flange and the inside face of the disc touch each other nor is it essential that the outer face of the disc and the face of the small end of the tapered hub portion be flush. I prefer to have a wedging action between the parts which can be increased as the parts wear down, regardless of how far the disc slides onto the hub as the fastening bolts are tightened.

I also provide a removable cover of sheet metal or the like, screwed or bolted on the periphery of the larger disc of the coupling and extending over and around the outer set of coupling pins. A circular opening is provided in the front of the cover member to permit the entrance and withdrawal of the smaller disc and its inner circle of pins so that the small disc, pins and flexible belt are substantially enclosed within the cover during operation.

In removing my new coupling the plug shaft is retracted and the coupling cover is unfastened and slid out of the way along the motor or driving shaft. The belt is then removed in a well known manner and the fastening bolts of either disc are unthreaded and rethreaded in the dewedging or secondary holes. Upon sufficient turning of the bolts, the disc and its attached pins are separated from the hub and can be withdrawn through the clearance between the two shafts. In a similar manner the other disc may be also removed and by expanding the split hubs they also may be removed. The cover can be removed from the shafts easily as soon as the larger disc has been removed.

Installation of the parts of my new coupling is the reverse of the above operation, the hubs being installed first, then the cover slid onto a shaft and then each disc fixed to its hub after which the cover is installed on the larger disc.

The axial adjustment of my coupling as the plug knives are moved toward the shell knives is usually accomplished in several stages. The coupling member on the driving shaft remains fixed in place thereon while the coupling member on the driven shaft may initially be at the extreme end thereof with the tips of the two opposite shafts about twelve inches apart.

After the driven shaft has been moved axially toward the driving shaft a short distance, such as three inches, the Jordan engine is stopped. The fastening bolts on the large disc are unscrewed sufficiently to allow the disc to separate from the hub about a quarter of an inch thus permitting the hub to be expanded and the coupling member slid along the shaft and tightened in a new position. The large disc and its hub can be similarly moved again, after the plug shaft has traveled a few more inches until the tip of the plug shaft approaches too close to the tip of the driving shaft to permit further adjustment.

In disassembling the plug from the Jordan engine, it may only be necessary to remove the larger disc of my coupling since in many such Jordans the hole through which the plug shaft is withdrawn is large enough to permit the hub of my coupling to pass through while still attached to the shaft.

In the drawings,

Fig. 1 is a side elevational view of my new coupling in use between an electric motor and a Jordan engine. The coupling pins are shown equal in length and the coupling cover is not shown.

Fig. 2 is an elevation, in section, on line 2—2 of Fig. 3.

Fig. 3 is a diagrammatic side sectional view on line 3—3 of Fig. 2, illustrating the split hub and the key between hub and disc, and showing short coupling pins on the driving disc.

Fig. 4 is a view similar to Fig. 3 on line 4—4 of Fig. 2, illustrating the bolts for holding disc and hub flange together and the key between hub and shaft and showing the plug shaft in a new position.

Fig. 5 is a view similar to Fig. 3 and Fig. 4, illustrating the dewedging holes in the disc, the bolts for holding the cover on the larger disc and the plug shaft in still another position.

Fig. 6 is an elevation from the large end of the hub, sectionalized to show the countersunk bolt for expanding the hub.

As shown in Fig. 1, M is an electric motor with a driving shaft 1 and the motor is fixed to the frame F in a well known manner. S is the conical shell of a Jordan engine J, with a driven shaft 2 which carries the conical plug P. A hand wheel H is provided which may be turned to cause the plug P and shaft 2 to move axially to take up the wear of the parts.

The flexible coupling C is made up of a coupling member A mounted on the motor or driving shaft 1 and a coupling member B mounted on the plug or driven shaft 2.

Coupling member B includes a disc 30 with a tapered bore 31 which may have one or more key ways 32 and has a set of coupling pins 33 which are spaced an equal distance from the centre and an equal distance apart from each other in a well known manner. A removable cover 34 of sheet material is attached to disc B by screws or bolts 35 and is bent at 36 so that the flange 37 may be screwed to each pin 33 by a screw 38. A primary set of unthreaded holes 40 are provided in disc B for threaded members such as fastening bolts 41 and a set of secondary threaded holes 42 are also provided for bolts 41 to be used for the purpose of dewedging or disengagement of the hub and disc.

Member B also includes a hub 50, having a forward tapered portion 51 which may have one or more keys 52 upon which the bore 31 and key way 32 of disc 30 may be guided and wedged in place by the tightening of bolts 41. An annular boss at 53 may be provided, on the inner face 55 of the hub 50 which can be turned down in any suitable manner if it is desired to increase or extend the wedging action of the parts. Threaded holes 54 are provided in the vertical shoulder 55 of the flange portion 56 of hub 50 to register with the primary unthreaded holes 40 of the disc B and to receive and hold fastening bolts 41. As shown in Fig. 5, the secondary holes 42 are opposite the solid portion of shoulder 55 so that a bolt 41 when turned therein will force the shoulder of the hub away from the disc and disengage the parts.

As shown in Fig. 6, hub 50 is split at 57 and a threaded member 58 is countersunk at 59 in one side of the split with the end 60 of 58 in contact with the face 61 of the other side of the split. The bore 62 is of uniform cross section and is of slightly less diameter than a shaft such as 1 or 2, there being a key way 63 in the hub guided on a key 64 on the shaft. To install the hub on a shaft, bolt 58 is turned to spread the split 57 of hub 50 until the bore is large enough to slide on the end of a shaft. After placement thereon, the bolt 58 is reversed and the natural spring of the hub causes it to grasp the key and shaft with a firm grip.

The hub 70 of coupling member A is similar to hub 50 of B and disc 10 of A is similar to disc 30 of B except that it is preferably of smaller diameter as shown in Figs. 3, 4, and 5. A set of coupling pins 73, 73, are provided on the face of 10 to interengage with pins 33 of 30 in a well known manner. As shown sleeves 74 are provided on 33 and 73, and a flexible belt such as 75 is interwound on the pin-carried sleeves to form an axially slidable flexible coupling of the usual construction.

Shaft 2 in Fig. 3 is in the maximum retracted position with the maximum clearance between the shaft ends. It is obvious that if coupling members A or B were of one piece construction as in certain prior devices, the pin, disc and hub could not be slid off the end of a shaft because it would strike the tips of the pins on the opposite coupling member. It is for that reason that such prior couplings have usually been split axially and require considerable maneuvering to prop up the lower section or hoist the upper section in removing or adjusting them.

In Fig. 4, I show the plug shaft 2 advanced toward shaft 1 several inches to take up wear on the plug knives and show the part B as having been moved rearwardly on shaft 2 to assume its original spacing from part A. In Fig. 5, the process has been repeated and shaft 2 has advanced several more inches while part B has been again moved rearwardly to its original spacing from part A.

When shaft 2 is retracted, as in Fig. 3, and by the use of my improved coupling, I can disengage a disc from its hub and have sufficient clearance, between the tips of the pins on the opposite coupling member and the face of the hub, to permit the disc to be withdrawn with ease. Of course I first unfasten the cover and slide it out of the way if there is room and if not, I make the cover in two or more parts to be lifted off the disc. After removing the cover and one disc with its pins, I can then remove the other disc and the two hubs if desired.

The construction of disc 10 and hub 70 of A is similar to that of B, there being primary fastening holes 140, and 154 and secondary de-wedging holes 142 for fastening bolts 141. As in part B, there are similar key ways and keys as well as a split at 157 and an expanding bolt 158 in hub 70.

I claim:

A device for mounting a coupling pin disc on a shaft, said device comprising a split, contractile hub of resilient metal mounted on said shaft and having a bore of less diameter than the shaft; a relatively thick and elongated rearward portion of said hub extending from the rearward end thereof to an annular vertical shoulder intermediate of said hub; a relatively thin and shorter forward portion of said hub tapering from said shoulder to the forward end of the hub with a gradually decreasing cross sectional area to form a seat for the bore of said disc; fastening bolts passing through smooth holes in said disc and engaged in threaded holes in the shoulder of said hub, said bolts being arranged to secure the disc to the hub and hold the forward portion of the hub in contracted position on the shaft and a bolt, threaded in one side of the split in the rearward portion of the hub, and in contact with the opposite side of said split, adapted to disengage said rearward portion from the shaft and to also disengage the forward portion thereof when said disc has been slidably unseated from said hub.

References Cited in the file of this patent

UNITED STATES PATENTS

| | | |
|---|---|---|
| 1,395,913 | Ford | Nov. 1, 1921 |
| 1,436,032 | Greer | Nov. 21, 1922 |
| 1,591,242 | Simpson | July 6, 1926 |
| 1,681,793 | Steiner | Aug. 21, 1928 |
| 2,157,838 | Warner | May 9, 1939 |
| 2,287,343 | Duda | June 23, 1942 |
| 2,377,046 | Siegerist | May 29, 1945 |
| 2,381,697 | Shepard | Aug. 7, 1945 |
| 2,407,032 | Myers | Sept. 3, 1946 |
| 2,482,662 | Dunne | Sept. 30, 1949 |

FOREIGN PATENTS

| | | |
|---|---|---|
| 260,468 | Great Britain | Nov. 4, 1926 |